May 26, 1931.  M. T. ASHE  1,807,233
CONTAINER
Filed April 19, 1929
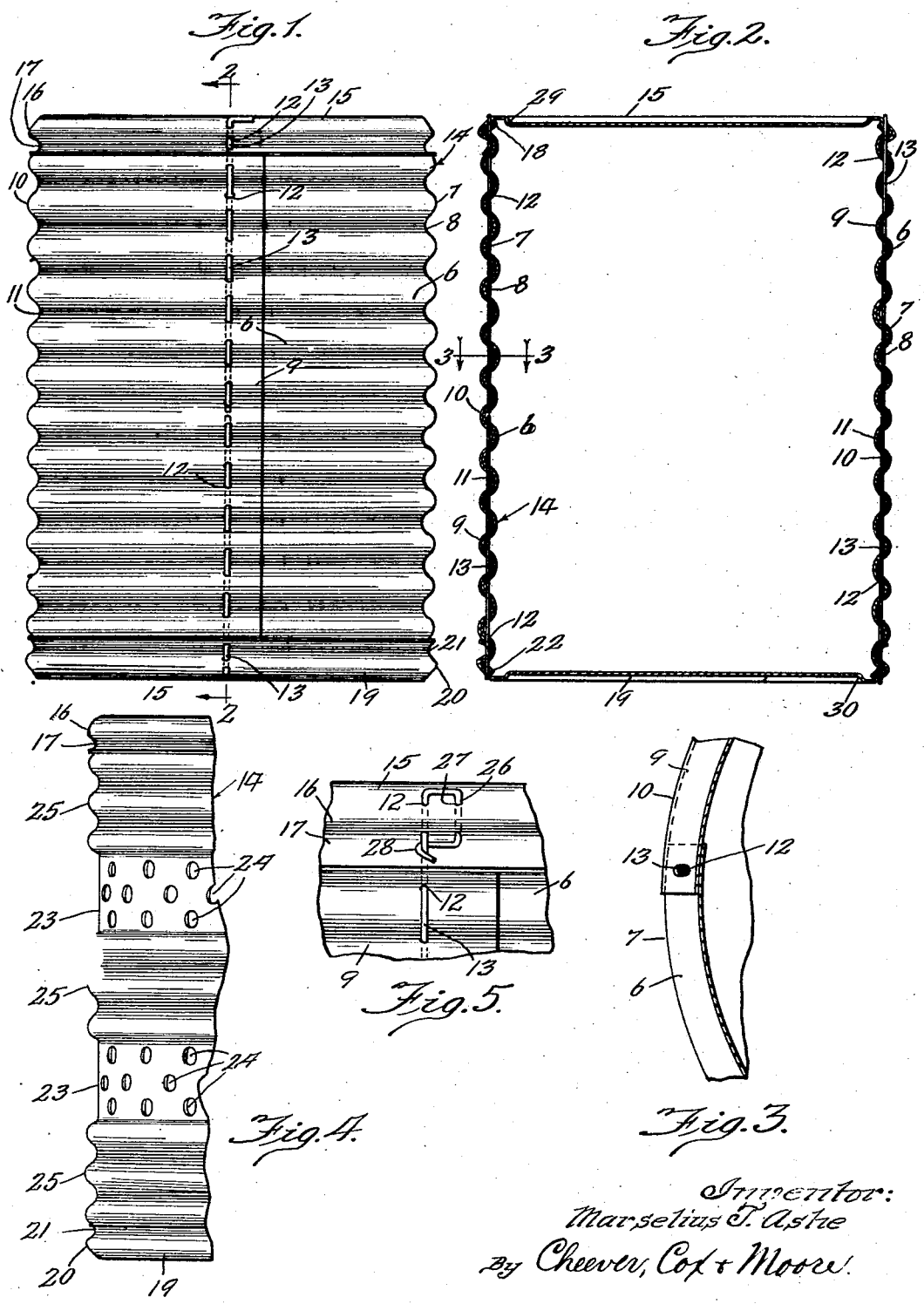
Inventor:
Marsetius T. Ashe
By Cheever, Cox + Moore
Attys Patented May 26, 1931

1,807,233

UNITED STATES PATENT OFFICE

MARSELIUS T. ASHE, OF GARDEN CITY, NEW YORK

CONTAINER

Application filed April 19, 1929. Serial No. 356,337.

This invention relates to containers for packing, storing, and shipping purposes, and its primary object is to provide an improved container or the like, which will be of knocked-down construction, which will be light and durable when assembled for use and which is compact when in its knocked-down form.

Another object is to provide a container which is made in sections, and which has a top and bottom detachably connected to the sections.

Another object is to provide a container which has interfitting members or side walls, which has a top and bottom having snap-on engagement with the side members, and which has means passing through the side members and the top and bottom for maintaining the parts in fixed position.

Another object is to provide a container which is made from corrugated sheet metal, which has a pair of substantially semi-cylindrical side members provided with ridges and furrows, the ridges in one side member nesting or engaging the furrows in the other member, which has substantially circular top and bottom members having snap-on engagement with the top and bottom edges of the side members, and which has fastening means passing through holes in the top and bottom members and in the ridges of the side members for securing the side members and the top and bottom together.

Further objects and advantages will hereinafter appear.

The invention comprises in general a pair of substantially semi-cylindrical side members, which are made from corrugated sheet metal and which have the corrugations running horizontally thereof. Alined holes are provided in the ridges to receive a wire or rod to hold the side members together. Substantially circular top and bottom members are also provided with corrugations and they have snap-on engagement with the top and bottom edges of the side members when the side members are fitted together to form a substantially cylindrical member. An inner ridge on the top and bottom is adapted to engage a furrow in the side members when they are fitted together and form the cylindrical member. Alined holes are also provided in the ridges in the top and bottom which correspond with the holes in the ridges of the side members so that a wire or other object may pass through these alined holes and secure the top and bottom members and the side members in rigid position.

The accompanying drawings illustrate a selected embodiment of the invention and the views therein are as follows:

Fig. 1 is an elevation of the improved container.

Fig. 2 is a vertical sectional view on the line 2—2 of Fig. 1.

Fig. 3 is a detail sectional view on the line 3—3 of Fig. 2.

Fig. 4 is a detail elevation of the container in a modified form.

Fig. 5 is a detail elevation showing the manner in which the fastening means may interlock.

Referring to the drawings, 6 designates a substantially semi-cylindrical side member, which is provided with horizontal ridges 7 and furrows 8. The side member 6 is adapted to be connected to a second substantially semi-cylindrical side member 9, and this second member is also provided with horizontal ridges 10 and furrows 11 so that the two members may be connected together, as shown in Figs. 1 and 2. The ridges and furrows in one of the side members will interfit or nest with the furrows and ridges in the other member, and when the two members are fastened together the member 6 will overlap the side member 9 on one side, and underlap the member 9 on the other side, Fig. 2.

Each member is provided with alined holes or apertures 12 which extend through the ridges 7 and 10 so that when the two members are in lapped position, Fig. 1, the holes in the member 6 will aline with the holes in the member 9. Rods or wires 13 pass through the holes 12 and connect the two members together. When the two side members are connected together they form a substantially cylindrical member 14, Fig. 1.

A substantially circular cover 15, having horizontal ridges 16 and horizontal furrows 17, has a snap-on fit with the end 18 of the cylindrical member 14. A bottom 19 is provided with horizontal ridges 20 and furrows 21 and it is adapted to have a snap-on fit with the bottom edge 22 of the two semi-cylindrical members when they are fastened together to form the substantially cylindrical member 14.

Instead of having the members 6 and 9 corrugated throughout their entire length, as shown in Figs. 1 and 2, they may be provided with substantially smooth straight portions 23, Fig. 4. These straight portions are preferably provided with a plurality of apertures 24 to provide circulation inside of the container when the container is used for shipping or storing apples, onions, potatoes, and other vegetables. The corrugated portions 25, Fig. 4, are also provided with the apertures 12 for the reception of the rod or fastening means 13.

In order to secure the top and bottom members and the side members in position, the rods 13 may have a bent over portion 26, Fig. 5, which engages an additional aperture 27 in the top and bottom. The end of each rod may be bent around itself at 28 to prevent the wire or fastening means 13 from coming out of the apertures 12, and to permit the top and bottom members to be maintained in proper position relative to the side members. It is understood of course that the top 15 and the bottom 19 are also provided with apertures 12 through which the rods 13 extend.

The top 15 and the bottom 19 may be indented at 29 and 30 respectively, Fig. 2, to strengthen the same and add rigidity thereto.

The invention provides a container or keg which can be readily and economically manufactured, which can be quickly and easily assembled, and which can be readily knocked-down and the bulk reduced and thereby effect a considerable saving in the cost of expressage or freight.

Changes may be made in the form, construction, and arrangement of the parts without departing from the spirit of the invention or sacrificing any of the advantages thereof, and the right is hereby reserved to make all such changes as fairly fall within the scope of the following claims:

The invention is hereby claimed as follows:

1. A container comprising a pair of side members having ridges and furrows, each member overlapping the other member on one side and underlapping it on the other side, the ridges on one member nesting or interfitting with furrows of the other member, a top and bottom having ridges and furrows, said side members and said top and bottom having alined holes in the ridges thereof, and removable means passing through said alined holes for holding said members and top and bottom in fixed rigid position.

2. A container comprising a pair of semi-cylindrical corrugated body members having alternate ridges and furrows, a top and bottom each having an annular flange with furrows and ridges, the ridges in the body members and the top and bottom being provided with alined holes, and fastening means passing through all of said alined holes for holding the sides, top and bottom together.

In witness whereof, I have hereunto subscribed my name.

MARSELIUS T. ASHE.